(12) United States Patent  
Wang

(10) Patent No.: US 9,252,592 B2  
(45) Date of Patent: Feb. 2, 2016

(54) SEMICONDUCTOR DEVICE

(71) Applicant: Macronix International Co., Ltd., Hsinchu (TW)

(72) Inventor: Shih Yu Wang, Taipei (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 14/184,570

(22) Filed: Feb. 19, 2014

(65) Prior Publication Data

US 2015/0236500 A1   Aug. 20, 2015

(51) Int. Cl.
*H02H 7/125* (2006.01)
*H02H 9/04* (2006.01)

(52) U.S. Cl.
CPC *H02H 7/125* (2013.01); *H02H 9/04* (2013.01)

(58) Field of Classification Search
CPC .................. H02H 7/125; H02H 9/04
See application file for complete search history.

(56) References Cited

U.S. PATENT DOCUMENTS 4,346,338 A * 8/1982 Nakamoto et al. .............. 322/28

* cited by examiner

*Primary Examiner* — Long Pham
(74) *Attorney, Agent, or Firm* — Finnegan, Henderson, Farabow, Garrett & Dunner LLP

(57) ABSTRACT

A semiconductor device includes a rectifier coupled between a circuit ground and a terminal for coupling to an external circuit, a transistor-enhanced current path coupled to the rectifier, and a switching circuit coupled to the transistor-enhanced current path and coupled between the terminal and the circuit ground. The switching circuit is configured to turn off the transistor-enhanced current path during normal operation, and turn on the transistor-enhanced current path when an electrostatic discharge occurs at the terminal.

19 Claims, 15 Drawing Sheets

SEMICONDUCTOR DEVICE

TECHNOLOGY FIELD

The disclosure relates to a semiconductor device and, more particularly, to a semiconductor device including a silicon-controlled rectifier (SCR) structure for electrostatic discharge (ESD) protection.

BACKGROUND

Electrostatic discharge (ESD) is a natural phenomenon occurring frequently in daily life. ESD can generate a large current in a short period of time. When the large current generated by the ESD passes through an integrated circuit in a short period of time, it may result in a power consumption much higher than what the integrated circuit can bear, causing physical damage to the integrated circuit and, possibly, circuit failure. In fact, ESD has become a major factor that causes failure of integrated circuits during their manufacture and use.

One approach to reduce or avoid damage caused by ESD is to use an ESD protection device or circuit to protect the integrated circuit. A silicon-controlled rectifier (SCR) is one of the devices suitable for use in ESD protection, because of its high current capability and small layout area. However, a conventional SCR has several disadvantages, such as high trigger voltage ($V_{tr}$, the voltage above which the SCR is turned on), low holding voltage ($V_h$, the voltage below which the SCR is turned off), and slow turn-on speed.

As an alternative to the conventional SCR, a diode triggered SCR (DTSCR) has recently been developed. Compared to the conventional SCR, the DTSCR can turn on at a relatively faster speed. However, the DTSCR may only be used with relatively low operating voltage, such as an operating voltage lower than about 1.5 V.

SUMMARY

In accordance with the disclosure, there is provided a semiconductor device including a rectifier coupled between a circuit ground and a terminal for coupling to an external circuit, a transistor-enhanced current path coupled to the rectifier, and a switching circuit coupled to the transistor-enhanced current path and coupled between the terminal and the circuit ground. The switching circuit is configured to turn off the transistor-enhanced current path during normal operation, and turn on the transistor enhanced current path when an electrostatic discharge occurs at the terminal.

Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Figure 1A:
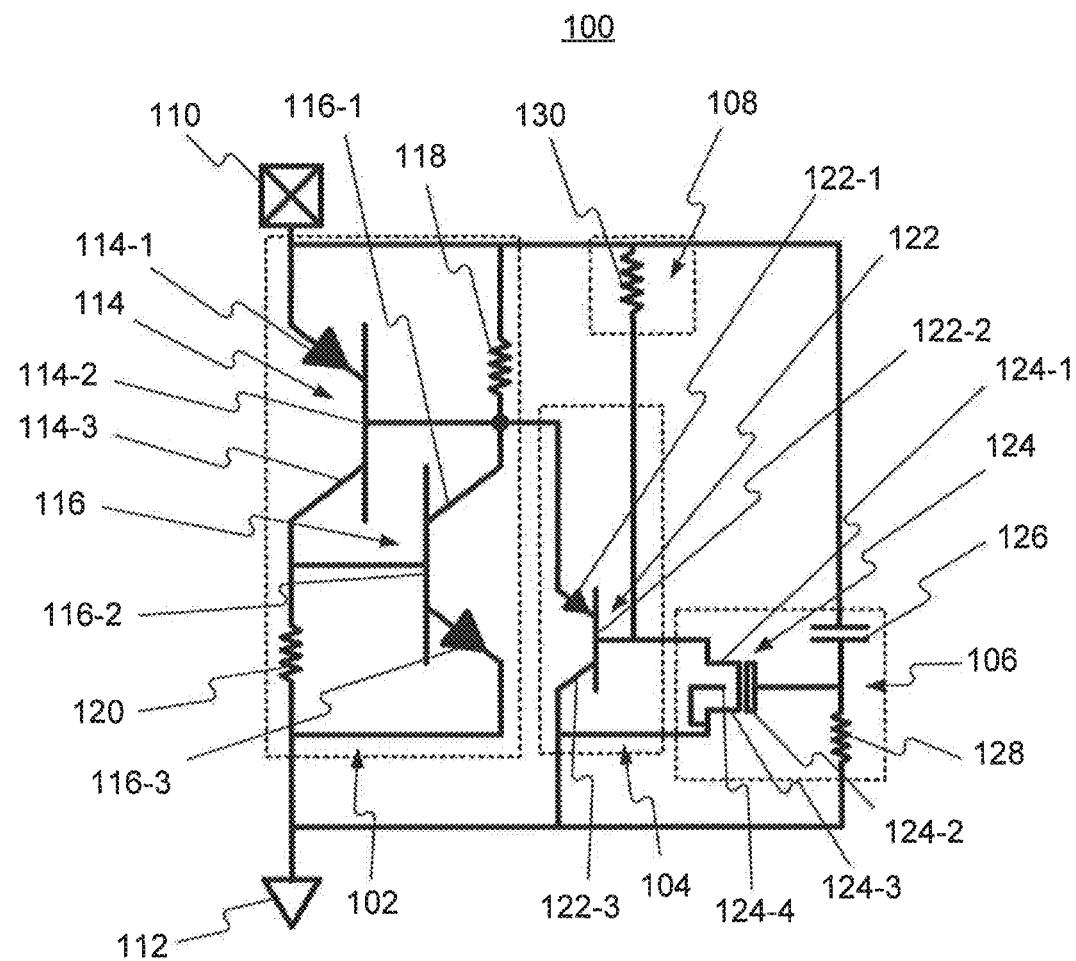
FIGS. 1A and 1B schematically show a semiconductor device according to an exemplary embodiment.

Embodiments consistent with the disclosure include a semiconductor device having a silicon-controlled rectifier (SCR) structure for electrostatic discharge (ESD) protection.

Hereinafter, embodiments consistent with the disclosure will be described with reference to the drawings. Wherever possible, the same reference numbers will be used throughout the drawings to refer to the same or like parts.

A silicon-controlled rectifier (SCR) is a device that can be used for ESD protection. As used herein, an SCR includes an N-well and a P-well formed adjacent to each other, with a heavily doped P-type ($P^+$) region and a heavily doped N-type ($N^+$) region formed in the N-well and the P-well, respectively. Therefore, the basic structure of the SCR includes a PNPN structure, where the $P^+$ region, the N-well, and the P-well form an intrinsic PNP transistor, while the N-well, the P-well, and the $N^+$ region form an intrinsic NPN transistor.

In operation, the SCR is usually connected in parallel with an external circuit to be protected. In accordance with one typical arrangement for connecting the SCR to the external circuit to be protected, an anode of the SCR is connected to a place in the external circuit where an ESD is likely to occur. A cathode of the SCR is connected to a circuit ground, which may also be the ground for the external circuit. When there is no ESD, the SCR is in a high-resistance state, so that the SCR does not interfere with operation of the external circuit. When the ESD occurs, excessive charge is generated by the ESD at the anode of the SCR, which increases the voltage applied to the SCR at the anode. When the voltage applied to the SCR becomes higher than the trigger voltage $V_{tr}$ of the SCR, avalanche breakdown occurs at the N-P junction formed by the N-well and the P-well. The current generated by the breakdown turns on one of the intrinsic PNP transistor or the intrinsic NPN transistor. Both of the intrinsic PNP and the intrinsic NPN transistors then become saturated. As a result, the SCR enters into a low-resistance state, i.e., is turned on, and starts to conduct the major portion of the excessive charge generated by the ESD. Consequently, the external circuit being protected bears only a minor portion of the ESD charge, and thus avoids being damaged. After the SCR enters into the low-resistance state and the ESD charge conducted by the SCR, the voltage applied to the SCR decreases. When the voltage applied to the SCR becomes lower than the holding voltage $V_h$ of the SCR, the SCR turns off.

In a semiconductor device for ESD protection consistent with embodiments of the disclosure, a transistor-enhanced current path, an ESD event switch, and a leakage control section are coupled to an SCR to improve the performance of ESD protection. The transistor-enhanced current path helps to reduce the trigger voltage V, so that a less severe ESD may trigger the semiconductor device and thus the risk of the external circuit being damaged by an ESD is further reduced. The ESD event switch turns on the transistor-enhanced current path when ESD occurs, to prevent accidental triggering of the SCR and the transistor-enhanced current path during normal operation. Moreover, the leakage control section helps to reduce leakage current during normal operation, thus reducing the impact on the performance of the external circuit and the power consumption.

Figure 1B:
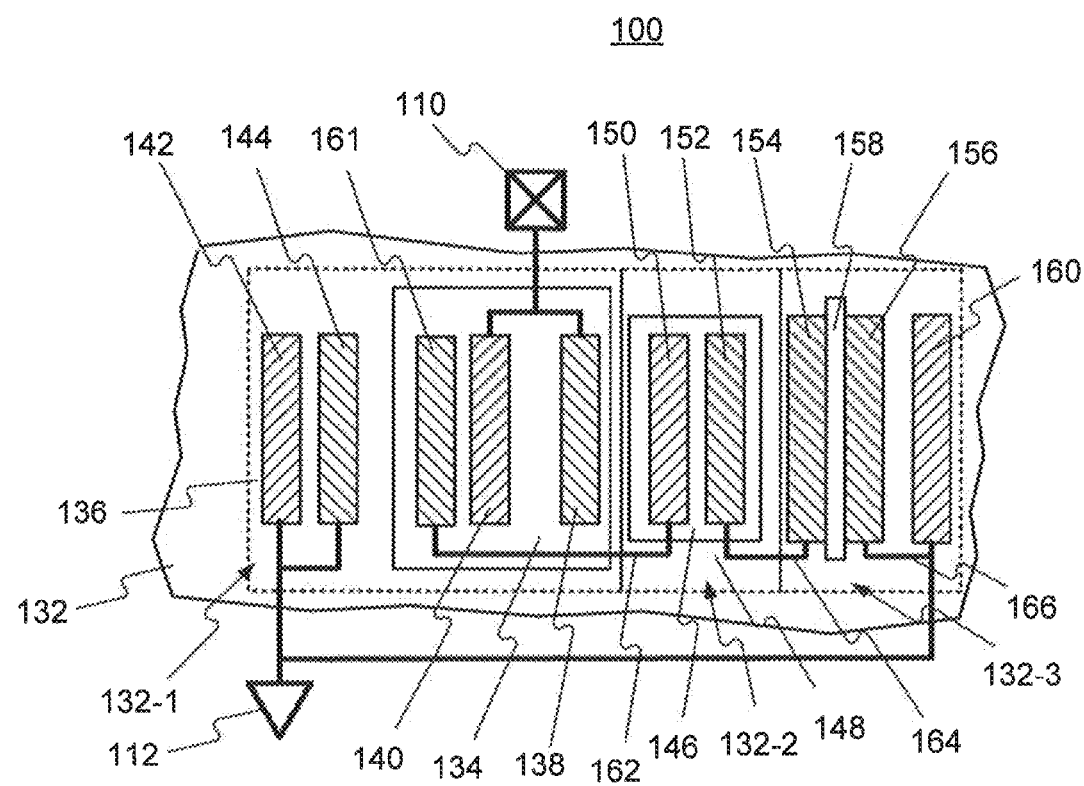

FIGS. 1A and 1B schematically show an exemplary semiconductor device 100 consistent with embodiments of the disclosure. FIG. 1A shows a circuit diagram of the semiconductor device 100, while FIG. 1B shows a layout of a portion of the semiconductor device 100.

The semiconductor device 100 includes an SCR 102, a transistor-enhanced current path 104 coupled to the SCR 102, an ESD event switch (also referred to as a switching circuit) 106 coupled to the transistor-enhanced current path 104, and a leakage control section 108 coupled to the transistor-enhanced current path 104.

The SCR is coupled between a terminal 110 and a circuit ground 112. The terminal 110 is for coupling to the external circuit to be protected, and serves as the anode of the SCR 102. The circuit ground 112 provides a reference electrical potential to the semiconductor device 100 and may be coupled to a ground of the external circuit to be protected. Alternatively or in addition, the circuit ground 112 may be coupled to earth. The circuit ground 112 serves as the cathode of the SCR 102.

As will be discussed in more detail below in this description, the SCR 102 is formed by creating heavily-doped regions in an N-well and a P-well adjacent to each other. The heavily-doped regions, the N-well, and the P-well form an intrinsic PNP bipolar junction transistor (BJT) and an intrinsic NPN BJT. These two intrinsic BJT's are shown in the circuit diagram of FIG. 1A, as an intrinsic PNP BJT 114 and an intrinsic NPN BJT 116. As shown in FIG. 1A, an emitter 114-1 of the intrinsic PNP BJT 114 is coupled to the terminal 110. A base 114-2 of the intrinsic PNP BJT 114 is coupled to a collector 116-1 of the intrinsic NPN BJT 116. A collector 114-3 of the intrinsic PNP BJT 114 is coupled to a base 116-2 of the intrinsic NPN BJT 116. An emitter 116-3 of the intrinsic NPN BJT 116 is coupled to the circuit ground 112.

As mentioned above, the SCR 102 is formed in an N-well and a P-well adjacent to each other. Therefore, a parasitic resistor in the N-well and a parasitic resistor in the P-well may also affect characteristics of the SCR 102. Thus, the circuit diagram of the SCR 102 also includes an N-well parasitic resistor 118 and a P-well parasitic resistor 120, as shown in FIG. 1A. The N-well parasitic resistor 118 is coupled between the terminal 110 and the base 114-2 of the intrinsic PNP BJT 114, as well as the collector 116-1 of the intrinsic NPN BJT 116. The P-well parasitic resistor 120 is coupled between the circuit ground 112 and the base 116-2 of the intrinsic NPN BJT 116, as well as the collector 114-3 of the intrinsic PNP BJT 114.

As shown in FIG. 1A, the transistor-enhanced current path 104 includes a PNP BJT 122. The PNP BJT 122 includes an emitter 122-1, a base 122-2, and a collector 122-3. The emitter 122-1 of the PNP BJT 122 is coupled to the base 114-2 of the intrinsic PNP BJT 114 and the collector 116-1 of the intrinsic NPN BJT 116, and is thus coupled to the terminal 110 through the N-well parasitic resistor 118. In some embodiments, the transistor-enhanced current path 104 may be formed in the same substrate as the SCR 102, as will be discussed in more detail below in this description.

The ESD event switch 106 includes an N-channel field-effect transistor (FET) 124, a capacitor (also referred to as a switching-circuit capacitor) 126, and a resistor (also referred to as a switching-circuit resistor) 128. A drain 124-1 of the N-channel FET 124 is coupled to the base 122-2 of the PNP BJT 122. A gate 124-2 of the N-channel FET 124 is coupled to the terminal 110 through the capacitor 126, and is coupled to the circuit ground 112 through the resistor 128. A source 124-3 of the N-channel FET 124 is coupled to the circuit ground 112. In the semiconductor device 100 shown in FIG. 1A, the source 124-3 of the N-channel FET 124 is also coupled to a body 124-4 of the N-channel FET 124.

As shown in FIG. 1A, the leakage control section 108 includes a resistor (also referred to as a leakage-control resistor) 130. One end of the resistor 130 is coupled to the terminal 110, and the other end of the resistor 130 is coupled to the base 122-2 of the PNP BJT 122.

Consistent with embodiments of the disclosure, when ESD occurs, a high voltage caused by the ESD is applied to the gate 124-2 of the N-channel FET 124 and turns on the N-channel FET 124. As a consequence, an electrical potential at the base 122-2 of the PNP BJT 122 is pulled down to a level close to that at the circuit ground 112. That is, a high electrical potential difference is applied across the PN junction between the emitter 122-1 and the base 122-2 of the PNP BJT 122. Therefore, the transistor-enhanced current path 104, i.e., the PNP BJT 122 in FIG. 1A, is turned on to conduct electric current. That is, an ESD current flows from the terminal 110, through the N-well parasitic resistor 118, the emitter 122-1 of the PNP BJT 122, the base 122-2 of the PNP BJT 122, the collector 122-3 of the PNP BJT 122, and the N-channel FET 124, to the circuit ground 112, resulting in a voltage across the N-channel parasitic resistor 118. This voltage is also applied between the emitter 114-1 and the base 114-2 of the intrinsic PNP BJT 114, which helps to forward bias the emitter-base PN junction of the intrinsic PNP BJT 114 and consequently helps to turn on the intrinsic PNP BJT 114.

During normal operation, the N-channel FET 124 is turned off, and thus the transistor-enhanced current path 104 is cut off. Moreover, the leakage control section 108 pulls the potential at the base 122-2 of the PNP BJT 122 to a level close to that at the terminal 110. As a consequence, the potential difference between the emitter 122-1 and the base 122-2 of the PNP BJT 122 is close to zero during normal operation, which helps to prevent accidental turning on of the transistor-enhanced current path 104.

FIG. 1B shows a layout of a portion of the semiconductor device 100. As shown in FIG. 1B, the semiconductor device 100 includes a substrate 132, where a part of the SCR 102, a part of the transistor-enhanced current path 104, and a part of the ESD event switch 106 are formed in a first portion 132-1, a second portion 132-2, and a third portion 132-3 of the substrate 132, respectively. In some embodiments, the substrate 132 may be, for example, a silicon substrate or a silicon-on-insulator (SOI) substrate. In addition, the substrate 132 may be a P-type substrate with an impurity concentration of about $1e17\ cm^{-3}$ to about $1e18\ cm^{-3}$. P-type impurities in the substrate 132 include, for example, boron or aluminum.

Specifically, the SCR 102 includes an N-well 134 formed in the first portion 132-1 of the substrate 132 by, for example, doping N-type impurities into a part of the substrate 132. Another part of the substrate 132 adjacent to the N-well 134 serves as a P ell 136 of the SCR 102. The N-type impurities include, for example, phosphorus, arsenic, or antimony. The impurity concentrations in the N-well 134 may be about $1e17\ cm^{-3}$ to about $1e18\ cm^{-3}$.

As shown in FIG. 1B, a heavily-doped N-type region (referred to herein as an N+ region) 138 and a heavily-doped P-type region (referred to herein as a P+ region) 140 are formed in the N-well 134. Similarly, a P+ region 142 and an N+ region 144 are formed in the P-well 136. The N+ region 138 serves as an N-well pickup and the P+ region 142 serves as a P-well pickup. Impurities concentrations in the heavily-doped regions 138, 140, 142, and 144 may each be about 1e20 cm$^{-3}$ to about 1e21 cm$^{-3}$, and may be the same or different from each other.

In the semiconductor device 100, the P+ region 140, the N-well 134, and the P-well 136 form the intrinsic PNP BJT 114, with the P+ region 140 serving as the emitter 114-1, the N-well 134 serving as the base 114-2, and the P-well 136 serving as the collector 114-3. The P-well 136 has a relatively lower impurity concentration and thus a relatively larger resistivity as compared to the P+ regions 140 and 142. A part of the P-well 136 forms the P-well parasitic resistor 120, which is then coupled to the circuit ground 112 through the P-well pickup, i.e., the P+ region 142.

Similarly, the N+ region 144, the P-well 136, and the N-well 134 form the intrinsic NPN BJT 116, with the N+ region 144 serving as the emitter 116-3, the P-well 136 serving as the base 116-2, and the N-well 134 serving as the collector 116-1. The N-well 134 has a relatively lower impurity concentration and thus a relatively larger resistivity as compared to the N+ regions 138 and 144. A part of the N-well 134 forms the N-well parasitic resistor 118, which is then coupled to the terminal 110 through the N-well pickup, i.e., the N+ region 138.

As shown in FIG. 1B, the PNP BJT 122 of the transistor-enhanced current path 104 also includes an N-well 146 formed in the second portion 132-2 of the substrate 132. The N-well 146 serves as the base 122-2 of the PNP BJT 122, and may be formed by doping N-type impurities, such as phosphorus, arsenic, or antimony, into a part of the substrate 132 at an impurity concentration of about 1e20 cm$^{-3}$ to about 1e21 cm$^{-3}$. Another part of the substrate 132 adjacent to the N-well 146 serves as a P-well 148, which serves as the collector 122-3 of the PNP BJT 122. A P+ region 150 is formed in the N-well 146 by, for example, doping P-type impurities, such as boron or aluminum, into the N-well 146 at an impurity concentration of about 1e20 cm$^{-3}$ to about 1e21 cm$^{-3}$. The P+ region 150 serves as the emitter 122-1 of the PNP BJT 122. An N+ region 152 is formed in the Norwell 146 by, for example, doping N-type impurities, such as phosphorus, arsenic, or antimony, into the N-well 146 at an impurity concentration of about 1e20 cm$^{-3}$ to about 1e21 cm$^{-3}$. The N+ region 152 serves as a base electrode for the base 122-2 of the PNP BJT 122.

As shown in FIG. 1B, the N-channel FET 124 includes N+ regions 154 and 156 formed in the third portion 132-3 of the substrate 132. The N+ regions 154 and 156 serve as the drain 124-1 and the source 124-3 of the N-channel FET 124, respectively, and may be formed by doping N-type impurities, such as phosphorus, arsenic, or antimony, into corresponding parts of the substrate 132 at an impurity concentration of about 1e20 cm$^{-3}$ to about 1e21 cm$^{-3}$. A heavily-doped polysilicon layer 158 is formed over the substrate 132 and serves as the gate 124-2 of the N-channel FET 124. A thin dielectric layer (not shown), such as a silicon dioxide layer, is formed between the heavily-doped polysilicon layer 158 and the substrate 132, serving as a gate dielectric layer of the N-channel FET 124.

In some embodiments, as shown in FIG. 1B, an additional P+ region 160 is formed in the substrate 132. The P+ region 160 is coupled to the circuit ground and serves as a substrate pickup. Such a substrate pickup on the one hand serves as a body electrode for coupling the body 124-4 of the N-channel FET 124 to the circuit ground 112 and to the source 124-3 of the N-channel FET 124. On the other hand, as one skilled in the art will now recognize, the collector 122-3, i.e., the P-well 148 in FIG. 1B, of the PNP BJT 122 is coupled to the P+ region 160 through a part of the substrate 132. Therefore, the P+ region 160 may also be considered as a collector electrode for the collector 122-3 of the PNP BJT 122.

As shown in FIG. 1B, an additional N+ region 161 is formed in the N-well 134 by, for example, doping N-type impurities, such as boron or aluminum, into the N-well 134 at an impurity concentration of about 1e20 cm$^{-3}$ to about 1e21 cm$^{-3}$. In some embodiments, as shown in FIG. 1 B, the additional N region 161 is formed near the P+ region 140, and on a different side of the P+ region 140 than the N+ region 138. The additional N+ region 161 serves as an extra N-well pickup for the N-well 134 and, as described below, is used to couple the base 114-2 of the intrinsic PNP BJT 114 and the collector 116-1 of the intrinsic NPN BJT 116, i.e., a part of the N-well 134, to the emitter 122-1 of the PNP BJT 122, i.e., the P+ region 150, through an electrical connection 162. Moreover, the N+ region 152 and the N+ region 154 are coupled to each other through an electrical connection 164. The N+ region 156 and the P+ region 160 are coupled to each other through an electrical connection 166. The electrical connections 162, 164, and 166 may include, for example, metal layers formed over the substrate 132.

FIG. 1B does not show the switching-circuit capacitor 126, the switching-circuit resistor 128, and the leakage-control resistor 130. These components may be formed in another portion of the substrate 132 not shown in FIG. 1 B, or may be separate electrical components and coupled to the components formed on the substrate 132 through, for example, metal wiring.

Figure 2A:
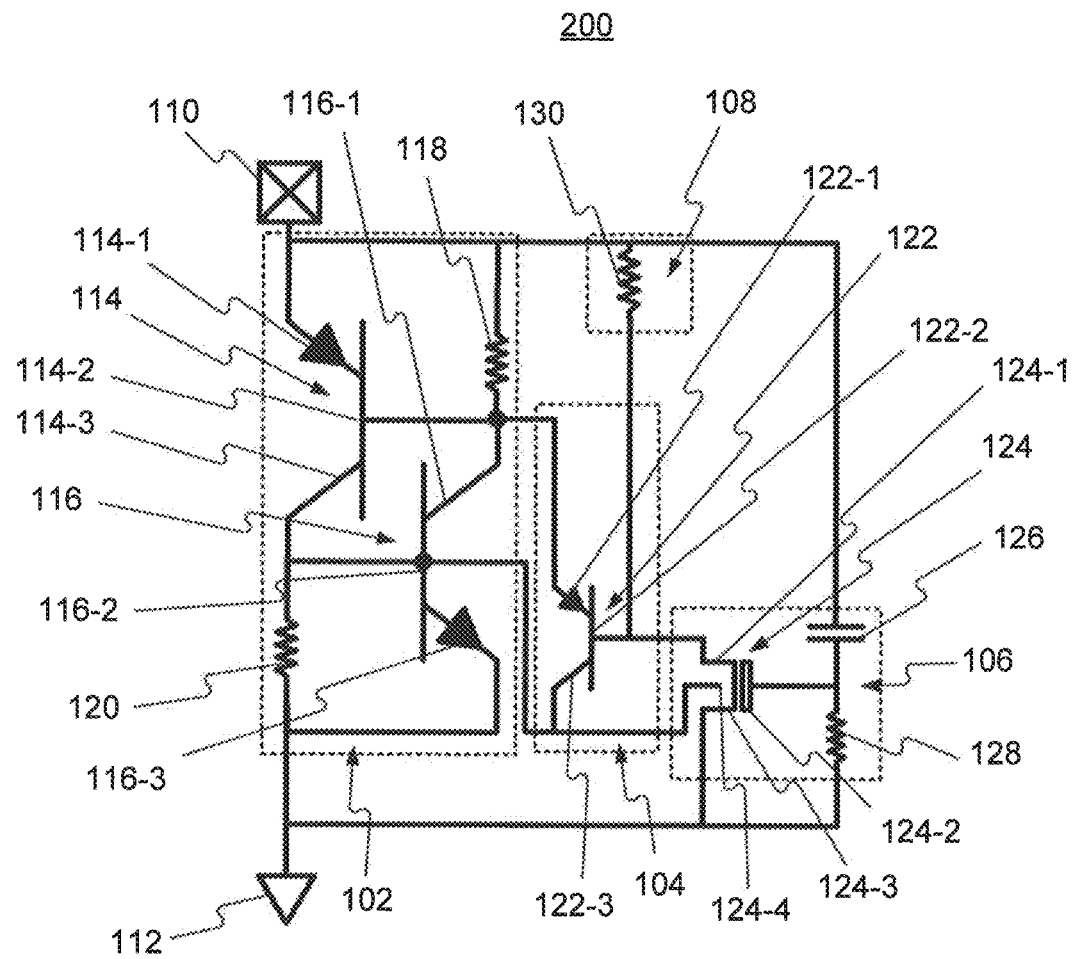
FIGS. 2A and 2B schematically show a semiconductor device according to an exemplary embodiment.
Figure 2B:
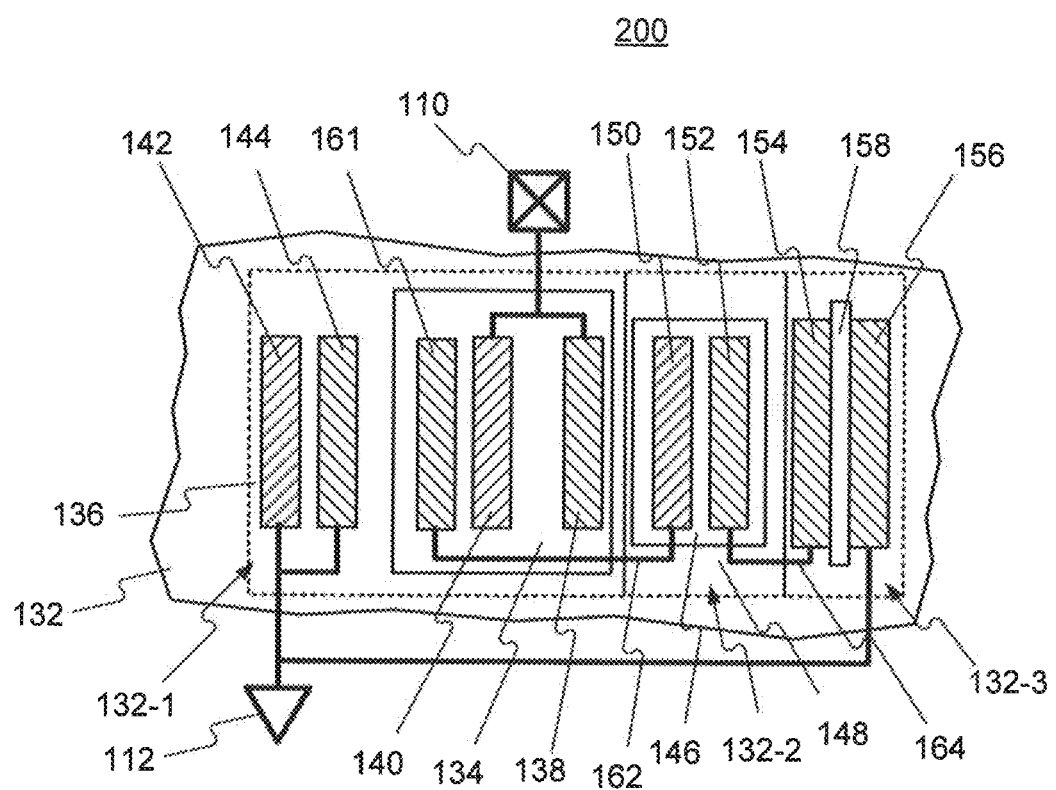

FIGS. 2A and 2B schematically show an exemplary semiconductor device 200 consistent with embodiments of the disclosure. FIG. 2A shows a circuit diagram of the semiconductor device 200, while FIG. 2B shows a layout of a portion of the semiconductor device 200.

The semiconductor device 200 shown in FIGS. 2A and 2B is similar to the semiconductor device 100 shown in FIGS. 1A and 1B, except that the collector 122-3 of the PNP BJT 122 is not directly coupled to the circuit ground 112, but is coupled to the base 116-2 of the intrinsic NPN BJT 116. In the layout shown in FIG. 2B, the P+ region 160 in the layout of FIG. 1B is omitted, and the N+ region 156 is directly coupled to the circuit ground 112. The body 124-4 of the N-channel FET 124 is coupled to the base 116-2 of the intrinsic NPN BJT 116.

In the semiconductor device 200, since part of the substrate 132 serving as the collector 122-3 of the PNP BJT 122 is not coupled to the circuit ground 112 through a substrate pickup, the electric current passing through the transistor-enhanced current path 104 does not flow to the circuit ground 112 directly, but enters the base 116-2 of the intrinsic NPN BJT 116. This electric current helps to trigger the NPN BJT 116, causing the NPN BJT 116, and consequently the SCR 102, to turn on faster.

Figure 3A:
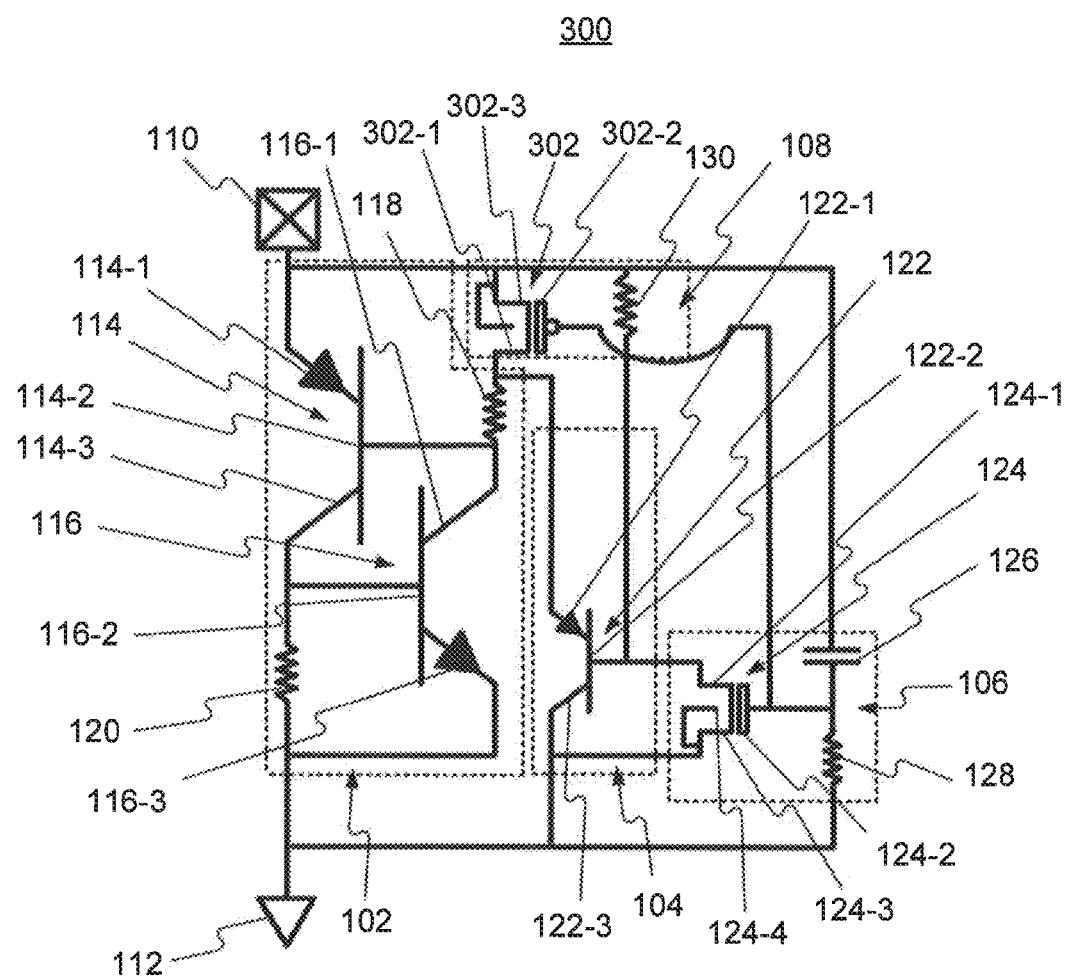
FIGS. 3A and 3B schematically show a semiconductor device according to an exemplary embodiment.
Figure 3B:
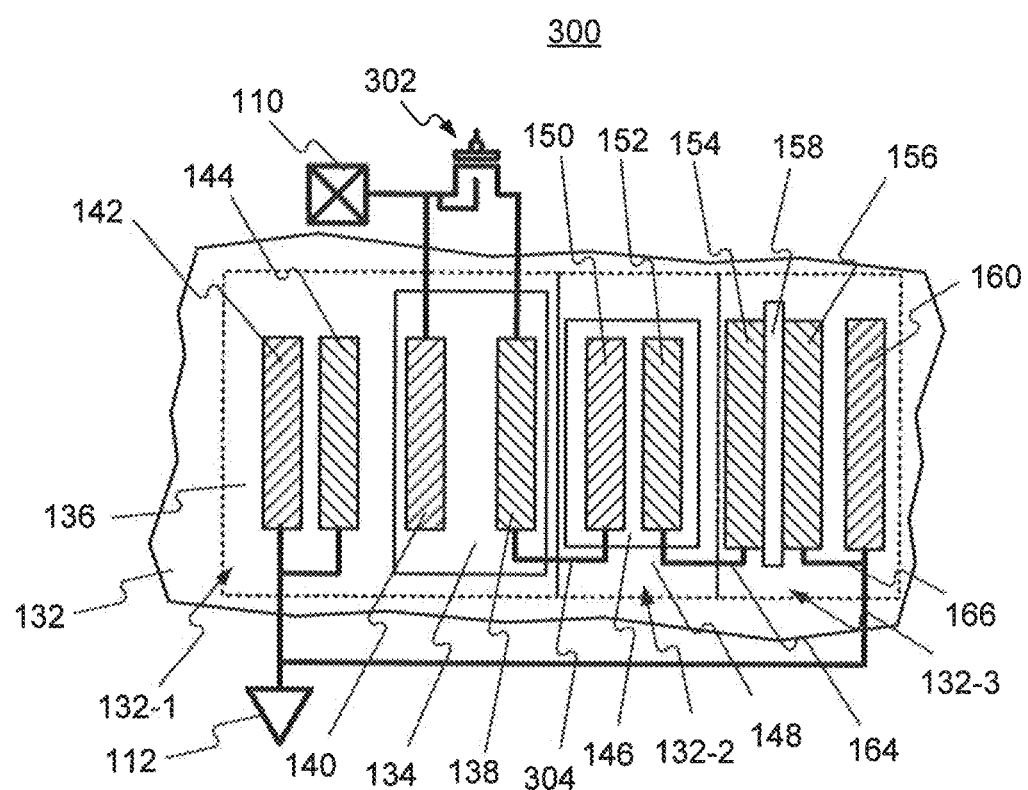

FIGS. 3A and 3B schematically show an exemplary semiconductor device 300 consistent with embodiments of the disclosure. FIG. 3A shows a circuit diagram of the semiconductor device 300, while FIG. 3B shows a layout of a portion of the semiconductor device 300.

The semiconductor device 300 shown in FIG. 3 is similar to the semiconductor device 100 shown in FIG. 1. However, in the semiconductor device 300, the leakage control section 108 further includes a P-channel FET 302. A drain 302-1 of the P-channel FET 302 is coupled to the N-well parasitic resistor 118, a gate 302-2 of the P-channel FET 302 is coupled to the gate 124-2 of the N-channel FET 124, and a source 302-3 of the P-channel FET 302 is coupled to the terminal 110. Moreover, in the semiconductor device 300, the emitter 122-1 of the PNP BJT 122 is directly coupled to the drain 302-1 of the P-channel FET 302, as shown in FIG. 3A.

Similar to the semiconductor device 100, in the semiconductor device 300, when ESD occurs, a high voltage caused by the ESD is applied to the gate 124-2 of the N-channel FET 124 and turns on the N-channel FET 124. As a consequence, the transistor-enhanced current path 104, i.e., the PNP BJT 122 in FIG. 3A, is turned on to conduct electric current, which helps to turn on the intrinsic PNP BJT 114. Moreover, the same high voltage caused by the ESD is applied to the gate 302-2 of the P-channel FET 302 and turns off the P-channel FET 302. As a consequence, the base 114-2 of the intrinsic PNP BJT 114 is disconnected from the terminal 110 (similar to a situation where a resistor having a very large, even close to an infinite, resistance, is connected between the base 114-2 of the intrinsic PNP BJT 114 and the terminal 110. This helps to increase the potential difference applied across a PN junction between the emitter 114-1 and the base 114-2 of the intrinsic PNP BJT 114, and thus reduces $V_{tr}$, and increases the turn-on speed, of the SCR 102, During normal operation, the N-channel FET 124 is turned off, and thus the transistor-enhanced current path 104 is cut off. In addition, the P-channel FET 302 is turned on so that the base 114-2 of the intrinsic PNP BJT 114 and the collector 116-1 of the intrinsic NPN BJT 116 are coupled to the terminal 110. Therefore, $V_{tr}$ during normal operation is relatively high.

The layout of the semiconductor device 300 (shown in FIG. 3B) is similar to that of the semiconductor device 100 (shown in FIG. 18). However, in the semiconductor device 300, no additional $N^+$ region is formed in the N-well 134. The $N^+$ region 138 is coupled to the $P^+$ region 150 through an electrical connection 304, such as a metal layer. The P-channel FET 302 may be formed in another portion of the substrate 132, or may be formed separately on a different substrate and coupled to the components on the substrate 132 through, for example, metal wirings.

Figure 4A:
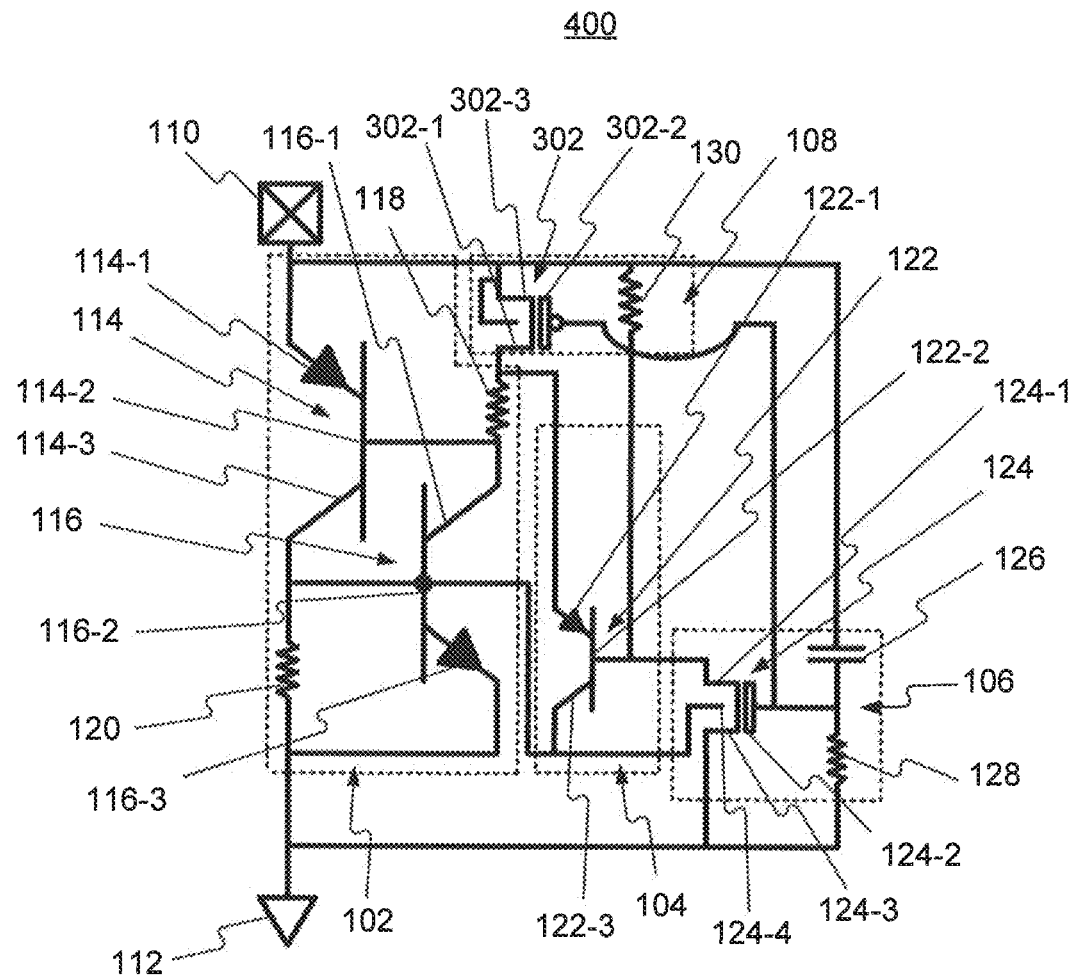
FIGS. 4A-4E schematically show a semiconductor device according to an exemplary embodiment, FIGS. 5A and 5B schematically show a semiconductor device according to an exemplary embodiment.
Figure 4B:
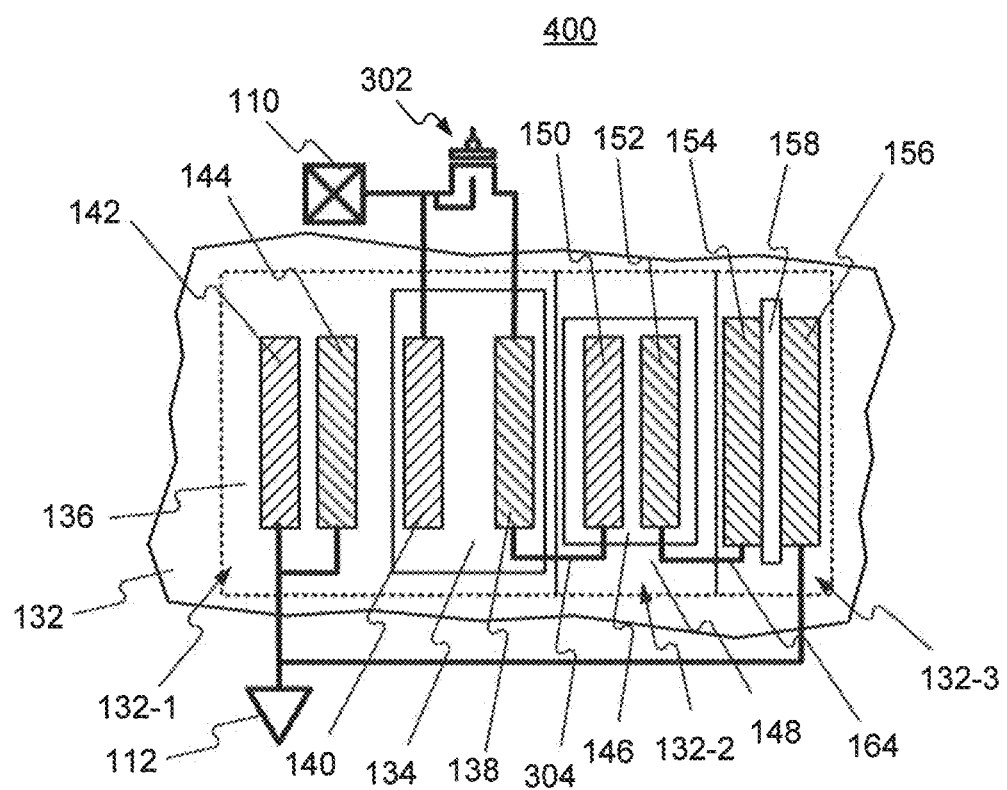
Figure 4C:
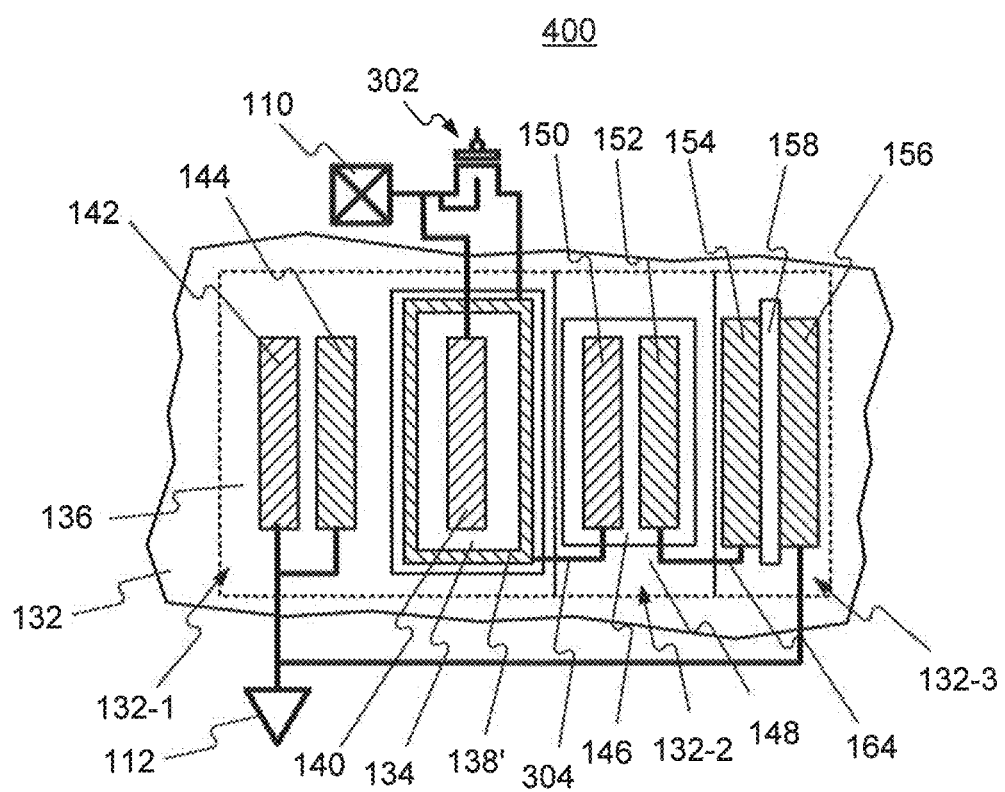
Figure 4D:
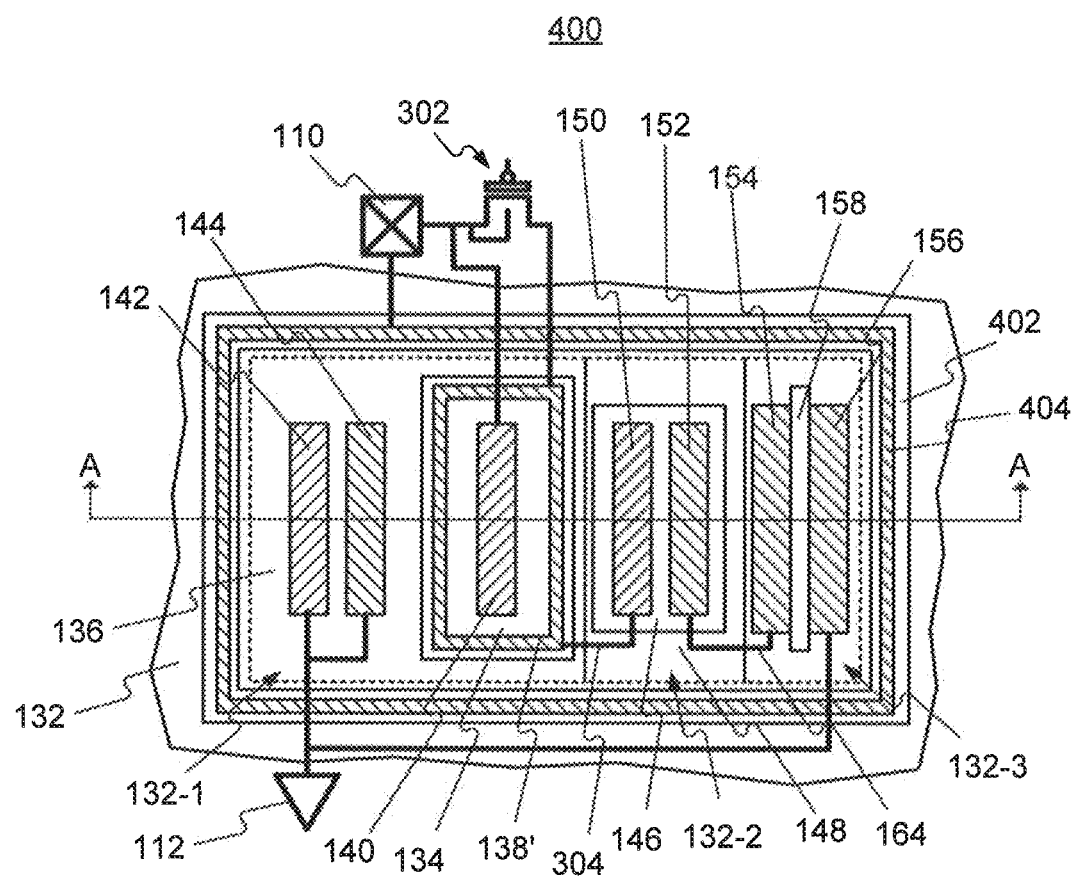
Figure 4E:
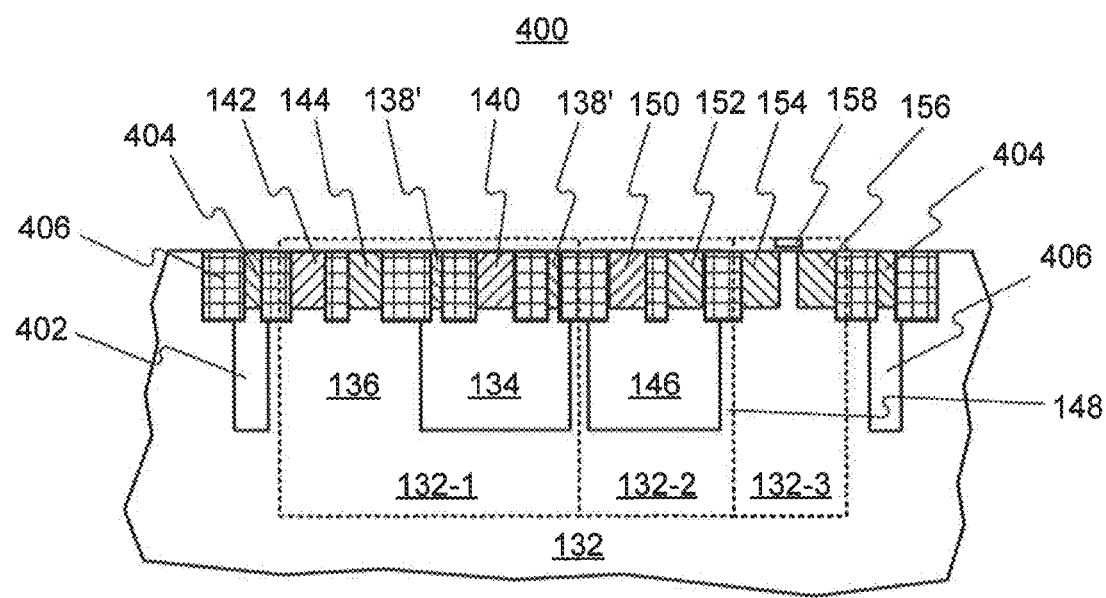

FIGS. 4A-4E schematically show an exemplary semiconductor device 400 consistent with embodiments of the disclosure. FIG. 4A shows a circuit diagram of the semiconductor device 400, FIGS. 4B-4D showent layouts of a portion of the semiconductor device 400, and FIG. 4E is a cross-sectional view of a portion of the semiconductor device 400 corresponding to the layout shown in FIG. 4D.

The semiconductor device 400 shown in FIGS. 4A 4E is similar to the semiconductor device 300 shown in FIGS. 3A and 3B. The differences between the circuit diagrams of the semiconductor devices 400 and 300 are similar to the differences between the circuit diagrams of the semiconductor devices 200 and 100, and thus are not described in detail here. Moreover, the differences between the layout of the semiconductor device 400 shown in FIG, 4B and the layout of the semiconductor device 300 shown in FIG. 3B are similar to the differences between the layout of the semiconductor device 200 shown in FIG. 2B and the layout of the semiconductor device 100 shown in FIG. 1B, and thus are not described in detail here, FIGS. 4C and 4D show alternative layouts for the semiconductor device 400. The layout shown in FIG. 4C is similar to the layout shown in FIG. 4B, except that a ring-shaped $N^+$ region 138' is formed in the N-well 134 instead of the stripe-shaped $N^+$ region 138. As shown in FIG, 40, the ring-shaped $N^+$ region 138' surrounds the $P^+$ region 140. Therefore, during normal operation, a portion of the ring-shaped $N^+$ region 138', which is connected to the terminal 110 through the P-channel FET 302, is formed between the anode and the cathode of the SCR 102. As a consequence, it becomes more difficult to forward bias the emitter-base junction of he intrinsic PNP BJT 114, and thus increases the $V_h$ of the SCR 102 during normal operation.

The layout shown in FIG. 4D is similar to the layout shown in FIG. 4C, except that a ring-shaped N-well 402 is formed in the substrate 132 and surrounds the first, second, and third portions 132-1, 132-2, and 132-3. A ring-shaped $N^+$ region 404 is formed in the ring-shaped N-well 402, serving as an N-well pickup for the ring-shaped N-well 402. The ring-shaped $N^+$ region 404 is coupled to the terminal 110. The ring-shaped N-well 402 forms a parasitic diode between the terminal 110 and the circuit ground 112, which helps to shunt the ESD current from the terminal 110 to the circuit ground 112. When ESD occurs and the transistor-enhanced current path 104 is turned on, most of the current in the substrate 132, for example, a collector current of the PNP BJT 122, is confined in a region surrounded by the ring-shaped N-well 402 and flows to the $P^+$ region 142. As a consequence, a voltage drop in the substrate 132 is higher, and thus a voltage applied to a PN junction between the base 116-2 and the emitter 116-3 of the intrinsic NPN BJT 116 is higher than in the situation without the ring-shaped N-well 402, which helps to turn on the intrinsic NPN BJT 116. The ring-shaped N-well 402 may also be applied in the structures shown in FIGS. 18, 2B, and 3B.

FIG. 4E is a cross-sectional view along a line A-A in FIG, 4D. As shown in FIG. 4E, the semiconductor device 400 also includes insulation layers 406 (the regions with cross-hatch patterns in FIG. 4E) formed near a surface of the substrate 132 and between heavily-doped regions. The insulation layers 406 help to reduce leakage current and the risk of breakdown. The insulation layers 406 are not shown in the layouts in FIGS. 4B-4D. Moreover, although insulation layers are not shown in the layouts in FIGS. 1B, 2B, and 3B, it is understood that each of the semiconductor devices 100, 200, or 300 may also include insulation layers formed near the surface of the substrate 132 and between heavily-doped regions. The insulation layers 406 may be formed of, for example, silicon dioxide by, for example, oxidizing corresponding portions of the substrate 132.

In each of the exemplary semiconductor devices shown in FIGS, 1A-4E, the transistor-enhanced current path 104 includes one PNP BJT 122 and correspondingly the leakage control section 108 includes one leakage-control resistor 130. However, the transistor-enhanced current path in a semiconductor device consistent with embodiments of the disclosure may include more than one PNP BJT, as discussed below.

Figure 5A:
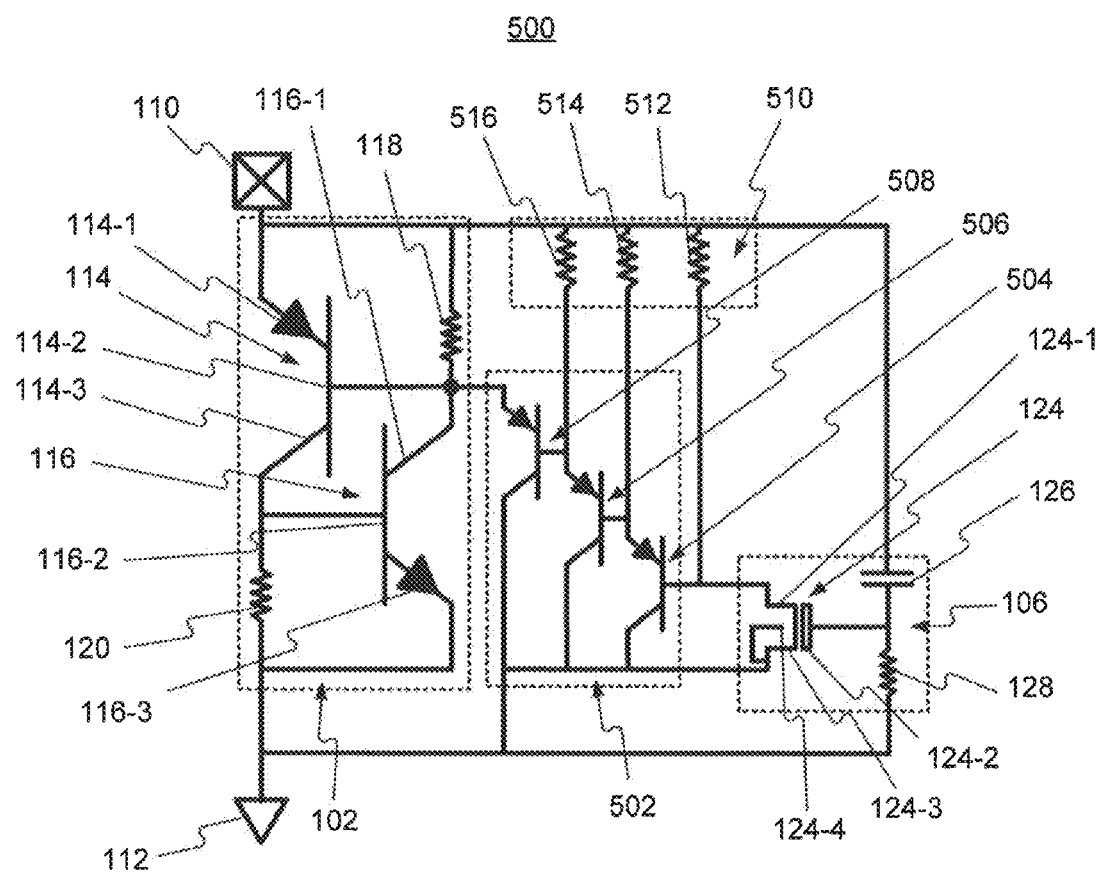
Figure 5B:
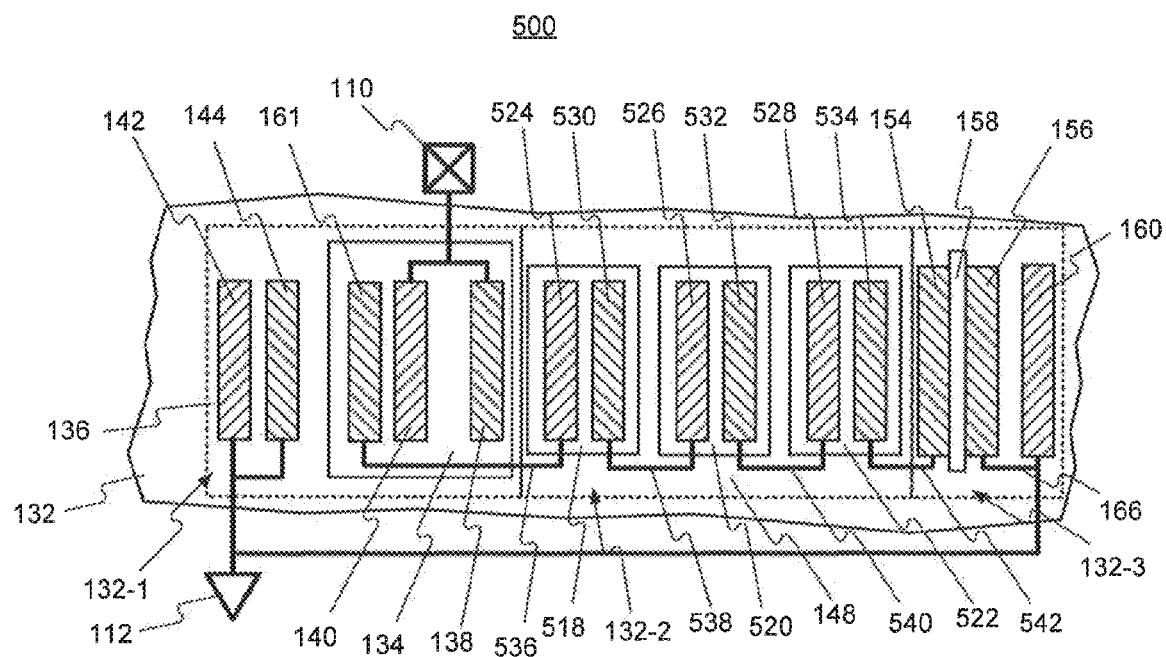

FIGS. 5A and 5B schematically show an exemplary semiconductor device 500 consistent with embodiments of the disclosure. FIG. 5A shows a circuit diagram of the semiconductor device 500, while FIG. 5B shows a layout of a portion of the semiconductor device 500. The semiconductor device 500 shown in FIGS. 5A and 58 is similar to the semiconductor device 100 shown in FIGS. 1A and 1B. However, a transistor-enhanced current path 502 in the semiconductor device 500 includes three PNP BJT's 504, 506, and 508 connected in a Darlington structure. Correspondingly, a leakage control section 510 of the semiconductor device 500 includes three leakage-control resistors 512, 514, and 516, each of which is coupled between the terminal 110 and a base of one of the PNP BJT's 504, 506, and 508. Compared to a single PNP BJT structure, a Darlington structure with multiple PNP BJT's has a larger current gain. As a consequence, the semiconductor device 500 may have a lower Was compared to the semiconductor device 100.

In the layout of the semiconductor device 500 shown in FIG. 5B, three N-wells 518, 520, and 522 are formed in the second portion 132-2 of the substrate 132. A P$^+$ region 524 is formed in the N-well 518, both of which, together with the P-well 148, form the PNP BJT 508, A P$^+$ region 526 is formed in the N-well 520, both of which, together with the P-well 148, form the PNP BJT 510. A P$^+$ region 528 is formed in the N-well 522, both of which, together with the P-well 148, form the PNP BJT 512. In addition, N$^+$ regions 530, 532, and 534 are also formed in the N-wells 518, 520, and 522, respectively, serving as N-well pickups for their corresponding N-wells (and thus base electrodes for corresponding PNP As shown in FIG. 5B, the P$^+$ region 524 is coupled to the N$^+$ region 161 in the N-well 134 through an electrical connection 536. The N$^+$ region 530 and the P$^+$ region 526 are coupled to each other through an electrical connection 538. The N$^+$ region 532 and the P$^+$ region 528 are coupled to each other through an electrical connection 540. The N$^+$ region 534 is coupled to the N$^+$ region 154 of the N-channel transistor 124 through an electrical connection 542. The electrical connections 536, 538, 540, and 542 may include, for example, metal layers formed over the substrate 132.

Consistent with embodiments of the disclosure, the transistor-enhanced current path 104 in each of the semiconductor devices 200, 300, and 400 may also include a Darlington structure with multiple PNP EMT's, similar to the semiconductor device 500. Detailed descriptions of such semiconductor devices are omitted.

Figure 6:
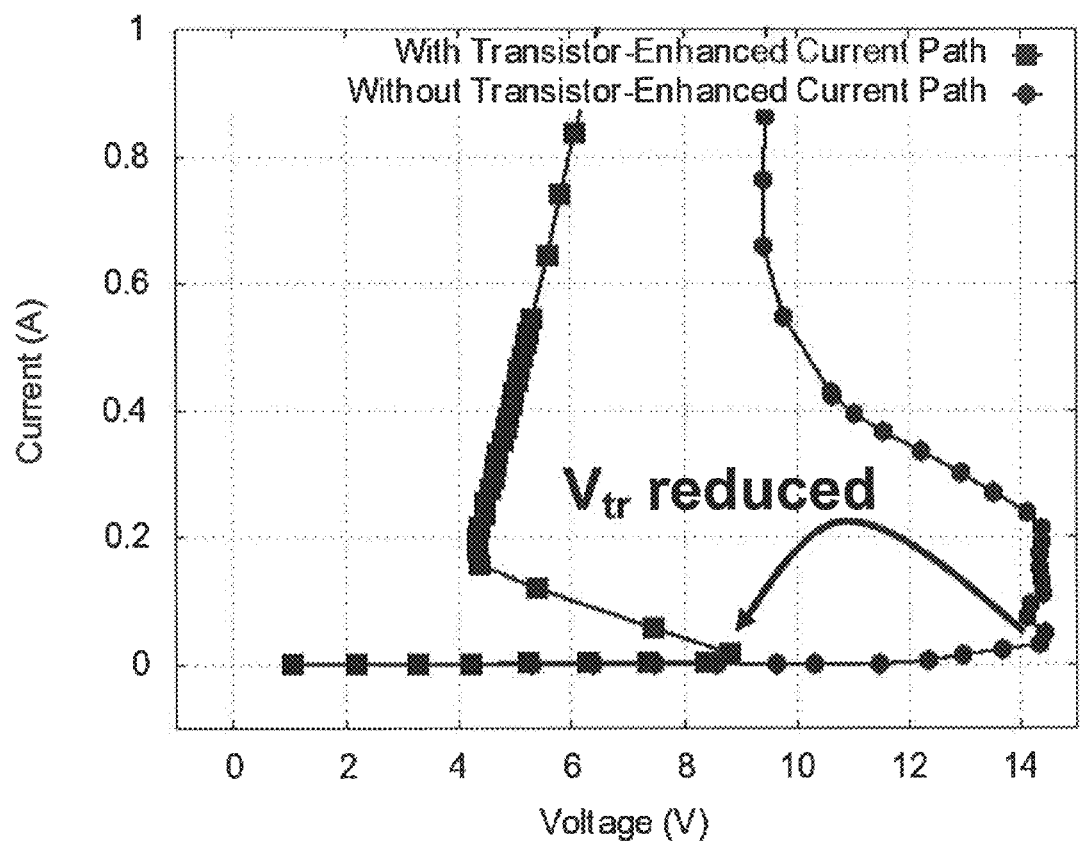
FIG. 6 shows current-voltage curves for a semiconductor device without a transistor-enhanced current path and a semiconductor device with a transistor-enhanced current path, respectively.

As discussed above, the transistor-enhanced current path consistent with embodiments of the disclosure helps to reduce the trigger voltage V$_{tr}$ of a semiconductor device having SCR, FIG. 6 shows a current-voltage curve (curve with circle points) for a semiconductor device having SCR but without a transistor-enhanced current path and a current-voltage curve (curve with square points) for a semiconductor device consistent with embodiments of the disclosure with a transistor-enhanced current path. It is seen from FIG. 6 that the trigger voltage V$_{tr}$ is reduced.

Figure 7:
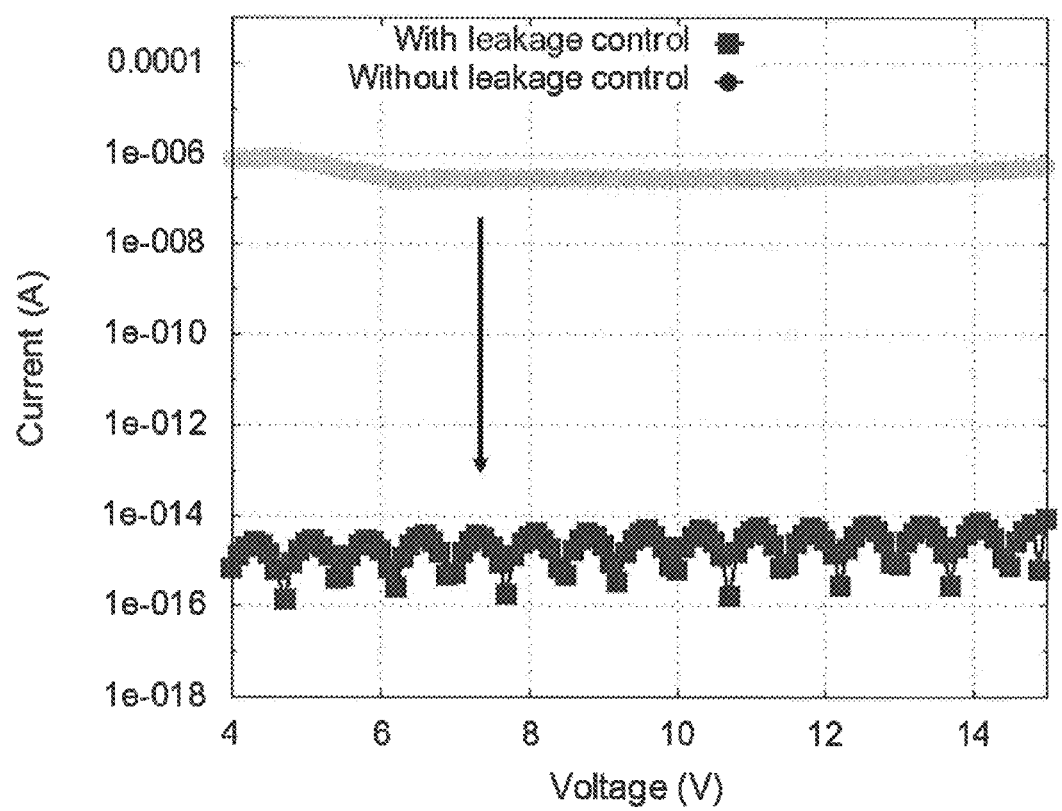
FIG. 7 shows leakage currents for a semiconductor device without leakage control and a semiconductor device with leakage control, respectively.

Also as discussed above, the leakage-control section consistent with embodiments of the disclosure helps to reduce leakage current. This effect is shown in FIG. 7, in which the curve with circle points represents the current-voltage relationship in a semiconductor device without leakage control, while the curve with square points represents the current-voltage relationship in a semiconductor device with leakage control consistent with embodiments of the disclosure. As can be seen from FIG. 7, with the leakage control section consistent with embodiments of the disclosure, the leakage current is reduced by several orders.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A semiconductor device, comprising:
    a rectifier coupled between a circuit ground and a terminal for coupling to an external circuit;
    a current path coupled to the rectifier, the current path including at least one transistor; and
    a switching circuit coupled to the current path and coupled between the terminal and the circuit ground, the switching circuit being configured to:
        turn off the current path during normal operation, and
        turn on the current path when an electrostatic discharge occurs at the terminal.

2. The semiconductor device of claim 1, wherein the rectifier comprises:
    an intrinsic PNP bipolar-junction transistor (BJT), an emitter of the intrinsic PNP BJT being electrically coupled to the terminal; and
    an intrinsic NPN BJT, a collector of the intrinsic NPN BJT being electrically coupled to a base of the intrinsic PNP BJT, a base of the intrinsic NPN BJT being electrically coupled to a collector of the intrinsic PNP BJT, and an emitter of the intrinsic NPN BJT being electrically coupled to the circuit ground.

3. The semiconductor device of claim 2, wherein the collector of the intrinsic NPN BJT is electrically coupled to the terminal.

4. The semiconductor device of claim 2, wherein the switching circuit comprises:
    an N-channel field-effect transistor (FET);
    a switching-circuit resistor, a gate of the N-channel FET being coupled to the circuit ground through the switching-circuit resistor; and
    a switching-circuit capacitor, the gate of the N-channel FET being coupled to the terminal through the switching-circuit capacitor.

5. The semiconductor device of claim 4, wherein:
    the current path includes a bypass PNP BJT,
    an emitter of the bypass PNP BJT is electrically coupled to the collector of the intrinsic NPN BJT,
    a base of the bypass PNP BJT is electrically coupled to a drain of the N-channel FET, and
    a collector of the bypass PNP BJT is electrically coupled to a source of the N-channel FET.

6. The semiconductor device of claim 5, further comprising:
    a leakage control section including a leakage-control resistor electrically coupled between the terminal and the base of the bypass PNP BJT.

7. The semiconductor device of claim 6, wherein:
    the leakage control section further includes a P-channel FET,
    a source of the P-channel FET is electrically coupled to the terminal,
    a drain of the P-channel FET is electrically coupled to the collector of the intrinsic NPN BJT, and
    a gate of the P-channel FET is electrically coupled to the gate of the N-channel FET.

8. The semiconductor device of claim 5, wherein the collector of the bypass PNP BJT is electrically coupled to the circuit ground.

9. The semiconductor device of claim 5, wherein the collector of the bypass PNP BJT is electrically coupled to the base of the intrinsic NPN BJT.

10. The semiconductor device of claim 4, wherein:
    the current path includes a Darlington structure comprising a plurality of stages, each stage including a bypass PNP BJT,
    an emitter of the bypass PNP BJT in a first stage of the Darlington structure is electrically coupled to the collector of the intrinsic NPN BJT,
    a base of the bypass PNP BJT in a last stage of the Darlington structure is electrically coupled to a drain of the N-channel FET, and
    a collector of the bypass PNP BJT in the last stage of the Darlington structure is electrically coupled to a source of the N-channel FET.

11. The semiconductor device of claim 10, further comprising:
a leakage control section, including a plurality of leakage-control resistors, each of the leakage-control resistors being electrically coupled between the terminal and a base of one of the bypass PNP BJT's.

12. The semiconductor device of claim 10, wherein collectors of the bypass PNP BJT's are electrically coupled to the circuit ground.

13. The semiconductor device of claim 10, wherein collectors of the bypass PNP BJT's are electrically coupled to the base of the intrinsic NPN BJT.

14. The semiconductor device of claim 2, wherein:
at least a part of the rectifier is formed in a first portion of a substrate,
at least a part of the current path is formed in a second portion of the substrate,
at least a part of the switching circuit is formed in a third portion of the substrate.

15. The semiconductor device of claim 14, wherein:
the first portion includes a P-well and an N-well, the P-well serving as the base of the intrinsic NPN BJT and the collector of the intrinsic PNP BJT, and the N-well serving as the collector of the intrinsic NPN BJT and the base of the intrinsic PNP BJT,
the emitter of the intrinsic PNP BJT includes a first heavily-doped P-type region ($P^+$ region) formed in the N-well, and
the emitter of the intrinsic NPN BJT includes a first heavily-doped N-type region ($N^+$ region) formed in the P-well,
the semiconductor device further comprising:
a second $P^+$ region formed in the P-welt and electrically coupled to the circuit ground; and
a second $N^+$ region formed in the N-well and electrically coupled to the terminal.

16. The semiconductor device of claim 5, wherein the second $N^+$ region is formed to surround the first $P^+$ region.

17. The semiconductor device of claim 15, further comprising:
a ring-shaped N-well surrounding the first, second, and third portions.

18. The semiconductor device of claim 17, further comprising:
a ring-shaped $N^+$ region formed in the ring-shaped N-well.

19. The semiconductor device of claim 1, wherein the rectifier is a silicon controlled rectifier (SCR).

* * * * *